US009716703B2

(12) United States Patent
Entezari et al.

(10) Patent No.: US 9,716,703 B2
(45) Date of Patent: Jul. 25, 2017

(54) SYSTEMS AND METHODS OF GEO-LOCATION BASED COMMUNITY OF INTEREST

(71) Applicants: Mehdi Entezari, Malvern, PA (US); Erik Arfvidson, Malvern, PA (US); Devon Andrew Beckett, Malvern, PA (US)

(72) Inventors: Mehdi Entezari, Malvern, PA (US); Erik Arfvidson, Malvern, PA (US); Devon Andrew Beckett, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 161 days.

(21) Appl. No.: 14/743,207

(22) Filed: Jun. 18, 2015

(65) Prior Publication Data

US 2016/0182480 A1     Jun. 23, 2016

Related U.S. Application Data

(63) Continuation-in-part of application No. 14/578,726, filed on Dec. 22, 2014, now abandoned.

(51) Int. Cl.
| | |
|---|---|
| G06F 15/16 | (2006.01) |
| H04L 29/06 | (2006.01) |
| H04W 4/02 | (2009.01) |
| H04W 4/08 | (2009.01) |
| H04L 29/12 | (2006.01) |
| H04W 4/00 | (2009.01) |

(52) U.S. Cl.
CPC ............. *H04L 63/08* (2013.01); *H04W 4/021* (2013.01); *H04W 4/08* (2013.01); *H04L 61/609* (2013.01); *H04L 63/0209* (2013.01); *H04L 63/107* (2013.01); *H04W 4/005* (2013.01); *H04W 4/023* (2013.01)

(58) Field of Classification Search
CPC . H04L 63/20; H04L 63/0236; H04L 63/0227; H04L 41/0803; H04L 29/06925; H04L 61/2007; G06F 11/1464
See application file for complete search history.

(56) References Cited

U.S. PATENT DOCUMENTS

| | | | | |
|---|---|---|---|---|
| 8,572,696 | B1 * | 10/2013 | Wiacek | H04W 4/02 380/247 |
| 8,938,777 | B1 * | 1/2015 | Bharali | H04L 63/107 370/389 |
| 2008/0155645 | A1 * | 6/2008 | Hutnik | H04L 63/107 726/1 |

* cited by examiner

*Primary Examiner* — Djenane Bayard
(74) *Attorney, Agent, or Firm* — Robert P. Marley

(57) ABSTRACT

The embodiments described herein recite a geo-location based community of interest (COI) system and method that add the capability to configure Network Connect Devices (NCD) to identify the location of the source and destination IP addresses. The NCDS may drop any packets that are destined to an IP address outside of its predefined radius. For any sent/received packets, the geo-location position of the remote IP-address on the wide area network (WAN) may be determined. The distance between two points on the earth given their latitudes and longitudes of the devices may be determined. If the distance is greater than the predefined range, the data packets may be denied. If the distance falls within the pre-determined range, the data packets are allowed to reach their destination.

10 Claims, 10 Drawing Sheets

SYSTEMS AND METHODS OF GEO-LOCATION BASED COMMUNITY OF INTEREST

CROSS-REFERENCES TO RELATED APPLICATIONS

The present disclosure is a continuation-in-part of U.S. Non-Provisional patent application Ser. No. 14/578,726 filed Dec. 22, 2014, entitled SYSTEMS AND METHODS OF GEO-LOCATION BASED COMMUNITY OF INTEREST, the entire contents of which are incorporated herein in their entirety.

COPYRIGHT NOTICE

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

TECHNICAL FIELD

The present invention relates generally to geo-location based communities of interest.

BACKGROUND

The Internet of Things (IoT, also Cloud of Things or CoT) refers to the interconnection of uniquely identifiable embedded computing-like devices within the existing Internet infrastructure. Typically, IoT is expected to offer advanced connectivity of devices, systems, and services that goes beyond machine-to-machine communications (M2M) and covers a variety of protocols, domains, and applications. The interconnection of these embedded devices (including smart objects), is expected to usher in automation in nearly all fields, while also enabling advanced applications like a Smart Grid. These connected devices could be within a home (e.g., thermostat or garage door opener), a workplace (e.g., building thermostat or lights), or within a factory (e.g., gas sensors or machines).

According to Gartner, there may be nearly 26 billion devices on the IoT: by 2020. ABI Research estimates that more than 30 billion devices will be wirelessly connected to the IoT by 2020. There are cases where the information (data packets) sourced from electronic internet connected devices are consumed within a zone and/or a geographical area. The zone could be inside a building, a campus and/or a geographical area. In most cases, information provided by electronic internet connected devices needs to be consumed within a zone of interest. The security of the devices becomes a major issue when information provided by these devices could be harvested for malicious activities outside of the zone of interest. For example, a thermostat or metering devices connected to the internet may provide information to outsiders about when the households are home or away.

In order to solve this problem, it is advantageous to provide a secure network architecture to accommodate internet connected devices.

SUMMARY

It would thus be highly desirable to provide a geo-location based community of interest (COI) system and method. The embodiments described herein add the capability to configure Network Connect Devices (NCD) (e.g., routers, network hubs, or smart devices acting as a network) to identify the location of the source and destination IP addresses. The NCDs would then drop any packets that are destined to an IP address outside of its predefined radius. The consumer of this product would select the local IPs of the devices that applies this geo-location based COI feature.

The NCD may be configured with the set of IP addresses that apply this feature. The location of the configured NCD may then be calculated. For any sent/received packets, the geo-location position of the remote IP-address on the wide area network (WAN) may be determined. The distance between two points on the earth given their latitudes and longitudes of the devices may be determined. If the distance is greater than the predefined range, the data packets may be denied. If the distance falls within the pre-determined range, the data packets are allowed to reach their destination.

In one embodiment, a computer implemented method comprises transmitting, by a host server to a router, a request to access a destination device with a pre-determined zone from a zone-based authentication mechanism (ZAM) application for an electronic device; transmitting, by the host server to the router, the geo-location of the IP address of the electronic device; when the ZAM application for the electronic device has not been activated for the destination device and the geo-location of the IP address of the electronic device is outside the zone of the destination device, receiving, by the host server from the router, an authentication request for the ZAM application of the electronic device; when the ZAM application for the electronic device has been activated for the destination device and the geo-location of the IP address of the electronic device is outside the zone of the destination device, receiving, by the host server from the router, an authentication request for the ZAM application of the electronic device; when the ZAM application for the electronic device has not been activated for the destination device and the geo-location of the IP address of the electronic device is within the zone of the destination device, receiving, by the host server from the router, an authentication request for the ZAM application of the electronic device; and when the ZAM application for the electronic device has been activated for the destination device and the geo-location of the IP address of the electronic device is within the zone of the destination device, receiving, by the host server from the router, an acknowledgement command for the ZAM application of the electronic device to allow the destination device to communicate with the ZAM application of the electronic device.

In another embodiment, a system comprises a server communicatively coupled to a router, the server comprising a non-transitory computer readable medium and a processor configured to execute a plurality of computer program modules on the computer readable medium, the computer readable medium comprising: an analytics module configured to transmit, to a router, a request to access a destination device with a pre-determined zone from a zone-based authentication mechanism (ZAM) application for an electronic device; and transmit, to the router, the geo-location of the IP address of the electronic device; and a decision module configured to: when the ZAM application for the electronic device has not been activated for the destination device and the geo-location of the IP address of the electronic device is outside the zone of the destination device, receive, from the router, an authentication request for the ZAM application of the electronic device; when the ZAM application on for the electronic device has been activated for the destination device and the geo-location of the IP address of the electronic device is outside the zone of the destination device, receive, from the router, an authentication request for the ZAM application of the electronic device; when the ZAM application for the electronic device has not been activated for the destination device and the geo-location of the IP address of the electronic device is within the zone of the destination device, receive, from the router, an authentication request for the ZAM application of the electronic device; and when the ZAM application for the electronic device has been activated for the destination device and the geo-location of the IP address of the electronic device is within the zone of the destination device, receive, from the router, an acknowledgement command for the ZAM application of the electronic device to allow the destination device to communicate with the ZAM application of the electronic device.

Additional features and advantages of an embodiment will be set forth in the description that follows, and in part will be apparent from the description. The objectives and other advantages of the invention will be realized and attained by the structure particularly pointed out in the exemplary embodiments in the written description and claims hereof as well as the appended drawings. It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Reference will now be made in detail to the preferred embodiments, examples of which are illustrated in the accompanying drawings. The embodiments described herein are intended to be exemplary. One skilled in the art recognizes that numerous alternative components and embodiments may be substituted for the particular examples described herein and still fall within the scope of the invention.

Figure 1:
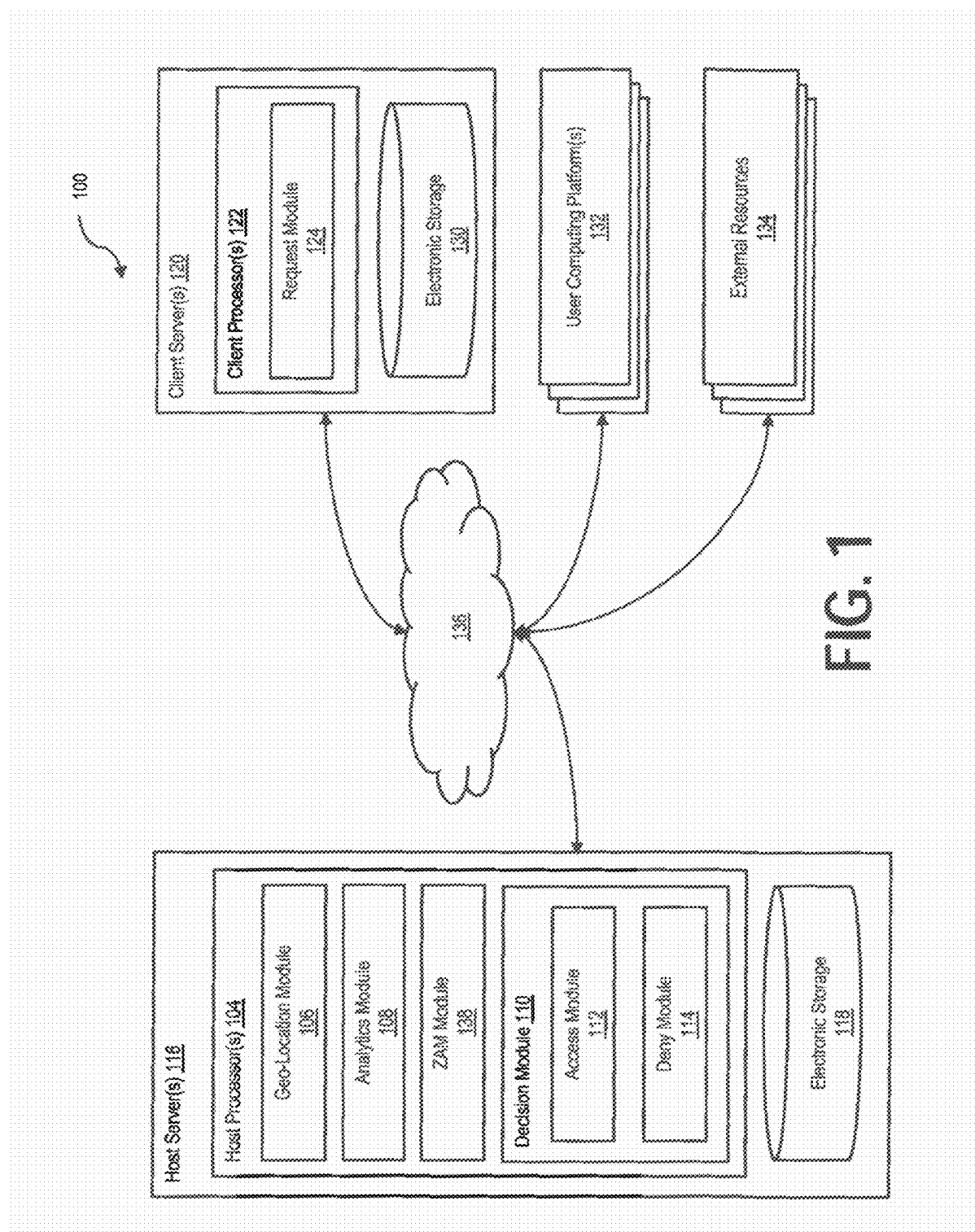
FIG. 1 illustrates a diagram of a system architecture for implementing a geo-location based community of interest, according to an exemplary embodiment.

FIG. 1 illustrates a diagram of a system 100 architecture for implementing a geo-location based community of interest, according to an exemplary embodiment. The system 100 may comprise a user computing platform 132 communicating with servers 116, 120 through a network 136. The servers 116, 120 may further communicate with external resources 134. The servers 116, 120 may be any computing device communicatively coupled over a network 136 to one or more computing devices, such as user computing platforms 132 and external resources 134.

The servers 116, 120 may comprise electronic storage 118, 130, one or more processors 104, 122, and/or any other components. The servers 116, 120 may include communication lines, or ports to enable the exchange of information with a network 136 and/or other user computing platform 132 and/or external resources 134. The processors 104, 122 may be configured to execute computer program modules. The processors 104, 122 may be configured to execute the computer program modules via one or more of hardware, software, and/or firmware. Although system 100 may be described in certain sections herein as including servers 116, 120, this is not intended to be limiting. For example, servers 116, 120 may be implemented by a cloud of computing platforms operating together as servers 116, 120.

Processors 104, 122 is configured to provide information processing capabilities in servers 116, 120. As such, processors 104, 122 may include one or more of a digital processor, an analog processor, a digital circuit designed to process information, an analog circuit designed to process information, a state machine, and/or other mechanisms for electronically processing information. Although processors 104, 122 is shown in FIG. 1 as a single entity, this is for illustrative purposes only. Processors 104, 122 may include a plurality of processing units. These processing units may be physically located within the same device, or processors 104, 122 may represent processing functionality of a plurality of devices operating in coordination. The processors 104, 122 may be configured to execute a geo-location module 106, an access module 112, a deny module 114, a request module 124, an analytics module 108, a decision module 110, and/or other modules. Processors 104, 122 may be configured to execute any modules by software, hardware, firmware, some combination of software, hardware, and/or firmware, and/or other mechanisms for configuring processing capabilities on processors 104, 122.

The servers 116, 120 and/or processors 104, 122 may be separate and distinct from system 100, and may be provided by an entity that is separate from, for example, the entity providing system servers 116, 120. The servers 116, 120 and/or processors 104, 122 may be configured to execute one or more computer program modules. The computer program modules may include one or more of a geo-location module 106, an access module 112, a deny module 114, a request module 124, an analytics module 108, a decision module 110, and/or other modules.

A geo-location module 106 when executed on a host processor 104, may be configured to define a geo-location. The host server may define a geo-location surrounding a source device internet protocol (IP) address. The source device may be a plurality of devices and/or a single device associated with the IP address. The plurality of devices may comprise a computer, a smartphone, a tablet, a web-cam, a printer, a home appliance, a television, and/or a thermostat. In some implementations, the defined geo-location is a boundary within a city limit. In other implementations, the defined geo-location is a pre-selected radius surrounding the source device IP address. In yet other implementations, the defined geo-location is a boundary within a zip code.

The user interface on the user computing platform 132 that is connected to a router, may receive selection of a first device that contains a unique IP address. The user interface may receive selection of a first device, second device, and/or a plurality of devices. The user interface on the user computing platform 132 that is connected to a router may receive selection of a type of first geo-location associated with the first device, a type of second geo-location associated with a second device and/or a particular geo-location associated with a plurality of devices. The geo-location type may be a boundary within a city limit.

In other implementations, the geo-location type is a radius surrounding the first device IP address. The first device may be a plurality of devices associated with the IP address. In yet other implementations, the geo-location type is a boundary within a zip code. The first device may comprise at least one of a computer, a smartphone, a tablet, a web-cam, a printer, a home appliance, a television, and/or a thermostat. In other implementations, the second device comprises at least one of a computer, a smartphone, a tablet, a web-cam, a printer, a home appliance, a television., and/or a thermostat.

The user interface on the user computing platform 132 that is connected to a router may receive selection of the range of the geo-location associated with the first device, second device, and/or a plurality of devices. The router may associate the first device, second device, and/or a plurality of devices with the geo-location and the range of the geo-location.

The host server may store a plurality of IP addresses in a host database. The plurality of IP addresses in the host database may be stored by user input and/or are automatically stored electronically. The host database may be stored in electronic storage 118 and/or any other storage.

A request module 124 when executed on a client processor 122 may be configured to receive the source IP address. The host server may receive from the source device IP address, a request to send information to a destination device IP address. The host server may receive a request to resolve a destination device IP address outside a geo-location surrounding a source device IP address. In some implementations, the geo-location is a boundary within a city limit. In other implementations, the geo-location is a radius surrounding the source device IP address. The source device may be a plurality of devices comprising a first device and a second device, the first device and the second device being different device types. The device types may comprise at least one of a computer, a smartphone, a tablet, a web-cam, a printer, a home appliance, a television, and/or a thermostat. In yet other implementations, the geo-location is a boundary within a zip code.

An analytics module 108, when executed on a host processor 104, may be configured to determine the location of the destination device IP address. The host server may determine the location of the destination device IP address. The host server may compare the destination device IP with the plurality of IP addresses and make a determination whether to permit or deny access to information based on predefined rules based on the geo-location. The analytics module 108 may be configured to transmit a request to access a destination device with a pre-determined zone from a zone-based authentication mechanism (ZAM) application for an electronic device, by a host server to a router. The analytics module 108 may be configured to transmit the geo-location of the IP address of the electronic device, by the host server to the router.

A decision module 110, when executed on a client processor 122, may be configured to determine whether to permit access and/or deny access to the destination device by making a determination and executing an access module 112 and/or a deny module 114. When the location of the destination device IP address is within the geo-location surrounding the source device IP address the host server may permit the request to send information through executing the access module 112. In other implementations, the router may permit access to the first device, second device, and/or a plurality of devices from an outside device within the first, second, and/or pre-defined geo-location and the first, second, and/or pre-defined range of the geo-location. The host server may send the destination device IP address to the router to permit the router to send the destination device IP address packets of information when the destination device IP address matches one of the plurality of IP addresses stored in the host database.

When the location of the destination device IP address is outside the pre-defined geo-location surrounding the source device IP address a second action and/or analysis may be executed. The second action and/or analysis may deny the request to send information, and the host server may deny the request to send information through executing the deny module 114. The host server may block the destination device IP address from the router when the destination device IP address does not match one of the plurality of IP addresses stored in the host database. In some implementations, blocking does not permit the router to send the destination device IP address packets of information to the source device.

The second action and/or analysis may determine if the destination device is a preselected device. When the destination device is a preselected device, a request may be sent to a host server. The request may be to resolve a destination IP address outside a pre-defined geo-location surrounding a source device IP address.

A zone-based authentication mechanism (ZAM) module 138 may execute a ZAM application on a user computing platform 132. A registration request from a zone-based authentication mechanism (ZAM) application on a user computing platform 132 may be received. The ZAM application may run on a user computing platform 132 (e.g., a smart device like a cell phone, robot, etc.). The ZAM application may activate and/or deactivate the user computing platform 132 when it is within an IoT device zone as the user computing platform 132 enters and/or leaves a zone, IoT devices can be limited within a zone of interest (or geo-location based community of interest (COI)). The ZAM application may also implement a zone tag device to communicate using, RFID, QR, NFC, and/or any other communications protocol with the user computing platform 132. The ZAM application may eliminate the need to receive a username and/or password input from the user computing platform 132 for authentication when the user computing platform is inside the zone surrounding the IoT device.

The ZAM application may provide the communication path between its service user (i.e., the user computing platform 132) and the local router utilizing a RISM that monitors activities to its IoT devices. The RISM may run within the router and may be managed and configured by an administrator. The administrator may be a person that provides privileges to a user computing platform 132 in order access an IoT device. The administrator may also set up the device zone. The RISM may validate requests to a device based on the geo-location of the user computing platform 132 executing the ZAM application.

The device zone may be a geographical area around the IoT device. The radius of the zone may be specified by the administrator. Any IP address of a user computing platform 132 that initiates connection to the IoT device may require authentication. A zone tag device of a location may be registered. The zone tag device may be used to register when a user computing platform 132 running a ZAM application is inside a zone utilizing standard communications (e.g., RFID, QR, NFC). For instance, a zone can be defined as the area inside a building and a zone tag device could be placed at each entrance of the building. Another example may be for cases where a zone is defined as the radius around a moving user computing platform 132 and a signal emitted by the user computing platform 132 can be detected. When a second user computing platform 132 with the ZAM application can receive the signal from the user computing platform 132, the user computing platform 132 is assumed to be inside the device zone.

An activation request of the ZAM application on the user computing platform 132 may be received. A privileged IP address may be an IP address with privileges to access an IoT device. The privilege may be validated whenever a connection to the IoT device is requested. An access privilege may be obtained via username and/or password received from the user computing platform 132 and/or the ZAM application executing on the user computing platform 132.

An activation notification for the ZAM application on the user computing platform 132 may be transmitted. A request to access the destination and/or IoT device from the ZAM application on the user computing platform 132 may be transmitted. In some implementations the user computing platform 132 sends out a packet with the target destination IP address IoT device). The RISM may intercept the packet and check the user computing platform 132 IP address against its list. If the user computing platform 132 IP address is authenticated, the RISM allows the packet to go through. Otherwise, the RISM may send a request to the IoT device IP address requesting zone activation information. The geo-location of the IoT device IP address may be located. If the zone is activated and the geo-location of the user computing platform 132 is inside the zone of the IoT device, then the IP address of the user computing platform 132 may be added to the list and the original packet may be allowed to proceed. Otherwise, the IP address of the user computing platform 132 may need to be authenticated. A determination of whether to provide the electronic device access to the destination device may be made.

In some implementations, the request to activate the ZAM application for the electronic device may be initiated by the electronic device and/or the zone tag device. The activation may transmitted through the zone tag device to the electronic device, and/or the activation may transmitted directly to the electronic device. The request to activate the ZAM application for the electronic device may occur when the electronic device is within a pre-determined radius of the zone tag device. The pre-determined zone of the destination device may be a radius around the destination device set by an administrator. The geo-location may be a radius surrounding the location of the electronic device IP address.

Although modules 106, 108, 110, 112, 114, 124, 138 are illustrated in FIG. 1 as being co-located within a single processing unit, in implementations in that processors 104, 122 include multiple processing units, one or more of modules 106, 108, 110, 112, 114, 124, 138 and/or other modules may be located remotely from the other modules. The description of the functionality provided by the different modules described above is for illustrative purposes, and is not intended to be limiting, as any of modules 106, 108, 110, 112, 114, 124, 138 and/or other modules may provide more or less functionality than is described. For example, one or more modules 106, 108, 110, 112, 114, 124, 138 and/or other modules may be eliminated, and some or all of its functionality may be provided by other ones of 106, 108, 110, 112, 114, 124, 138 and/or other modules. As another example, processors 104, 122 may be configured to execute one or more additional modules that may perform some or all of the functionality attributed below to one of 106, 108, 110, 112, 114, 124, 138 and/or other modules.

Electronic storage 118, 130 may comprise electronic storage media that electronically stores information. The electronic storage media of electronic storage 118, 130 may include one or both of system storage that is provided integrally with servers 116, 120 and/or removable storage that is removably connectable to servers 116, 120 via, for example, a port (e.g., a USB port, a firewire port, etc.) or a drive (e.g., a disk drive, etc.). Electronic storage 118, 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118, 130 may include one or more virtual storage resources (e.g., cloud storage, a virtual private network, and/or other virtual storage resources). Electronic storage 118, 130 may store software algorithms, information determined by processors 104, 122, information received from servers 116, 120, information received from user computing platform 132, and/or other information that enables servers 116, 120 to function as described herein.

The computer program modules may be configured to enable an expert or user associated with the given user computing platform 132 to interface with system 100 and/or external resources 134, and/or provide other functionality attributed herein to user computing platform 132.

In the exemplary embodiment, user computing platform 132 may be any computing device comprising processors and software modules capable of executing the processes and tasks described herein. Non-limiting examples of user computing platform 132 may include a desktop computer, a laptop computer, a handheld computer, a tablet computing platform, a netbook, a smartphone, a gaming console, and/or other computing platforms. In other embodiments, user computing platform 132 may be a variety of electronic computing devices.

Each of the user computing platforms 132 may have distinct operating systems, or platforms. The user computing platform 132 may be executing the same platform or the user computing platform 132 may be executing different platforms. The user computing platform 132 may be capable of executing multiple platforms. In some embodiments, user computing platform 132 may be used by a software developer, user and/or other system administrator to control the server, over a network 136. In other embodiments, user computing platform 132 may be targeted to receive test modules to execute.

A user may interact with a user interface that resides directly on the servers 116, 120 for system administration and control. In other embodiments, user computing platform 132 may be used to remotely conduct system administration. A given user computing platform 132 may include one or more processors 104, 122 configured to execute computer program modules.

The external resources 134 may include sources of information, hosts and/or providers of environments outside of system 100, external entities participating with system 100, and/or other resources. In some implementations, some or all of the functionality attributed herein to external resources 134 may be provided by resources included in system 100.

The network 136 may comprise any common communication architecture that facilitates communication between computing devices, which in this embodiment the computing devices would be the servers 116, 120 and the user computing platform 132. The network 136 may be the Internet, a private intranet, or some hybrid of the two. The network may comprise a local router containing a Router IoT Security Management (RISM). The RISM may validate requests to a device based on the geo-location of the user computing platform 132 executing the ZAM module. The RISM may run in the router and may be managed and configured by the router administrator.

Figure 2:
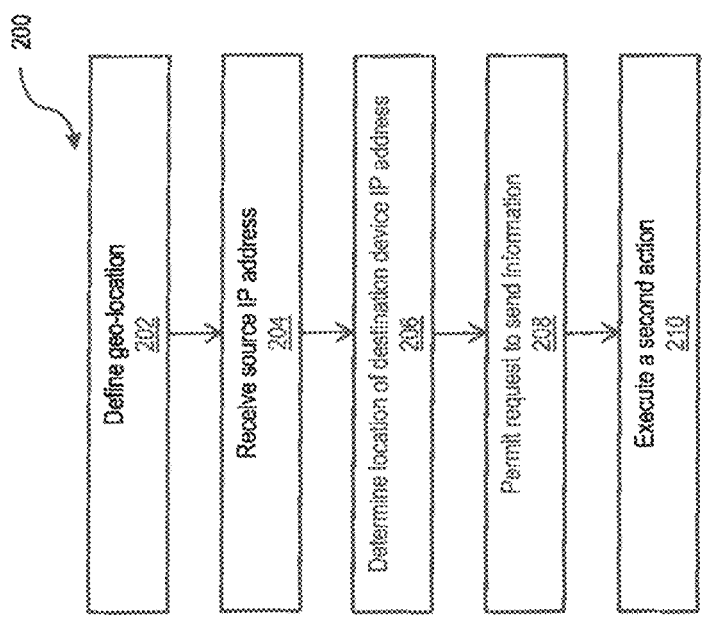
FIG. 2 illustrates a flow chart showing steps for a method for implementing a geo-location based community of interest, according to an exemplary embodiment.

FIG. 2 illustrates a flow chart 200 showing steps for a method for implementing a geo-location based community of interest, according to an exemplary embodiment.

The method for implementing a geo-location based community of interest, may be accomplished with one or more additional steps not described, and/or without one or more of the steps discussed. Additionally, the order in the steps of the method for implementing a geo-location based community of interest are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the steps of method 200 in response to instructions stored electronically on an electronic storage medium. The one or more processing devices may include one or more devices configured through hardware, firmware, and/or software to be specifically designed for execution of one or more of the steps of method 200.

At step 202, the geo-location may be defined. The host server may define a geo-location surrounding a source device internet protocol (IP) address. The source device may be a plurality of devices and/or a single device associated with the IP address. The plurality of devices may comprise a computer, a smartphone, a tablet, a web-cam, a printer, a home appliance, a television, and/or a thermostat.

The defined geo-location may be a boundary within a city limit. In other implementations, the defined geo-location is a pre-selected radius surrounding the source device IP address. In yet other implementations, the defined geo-location is a boundary within a zip code. Step 202 may be performed by a geo-location module the same as or similar to geo-location module 106 (shown in FIG. I and described above).

At step 204, the source IP address may be received. The host server may receive from the source device IP address, a request to send information to a destination device IP address. Step 204 may be performed by a request module the same as or similar to request module 124 (shown in FIG. 1 and described above).

At step 206, the location of the destination device IP address may be determined. The host server may determine the location of the destination device IP address. Step 206 may be performed by an analytics module the same or similar to analytics module 108 (shown in FIG. 1 and described above).

At step 208, the request to send information may be permitted. When the location of the destination device IP address is within the geo-location surrounding the source device IP address, the host server may permit the request to send information. Step 208 may be performed by decision module the same or similar to decision module 110 and/or access module 112 (shown in FIG. 1 and described above).

At step 210, a second action may be executed. When the location of the destination device IP address is outside the pre-defined geo-location surrounding the source device IP address, a second action and/or analysis may be executed. The second action and/or analysis may be denying the request to send information. In other implementations, the second action and/or analysis may determine if the destination device is a preselected device. When the destination device is a preselected device, a request is sent to a host server. The request may be to resolve a destination IP address outside a pre-defined geo-location surrounding a source device IP address. Step 210 may be performed by decision module the same or similar to decision module 110, access module 112, and/or deny module 114 (shown in FIG. 1 and described above).

Figure 3:
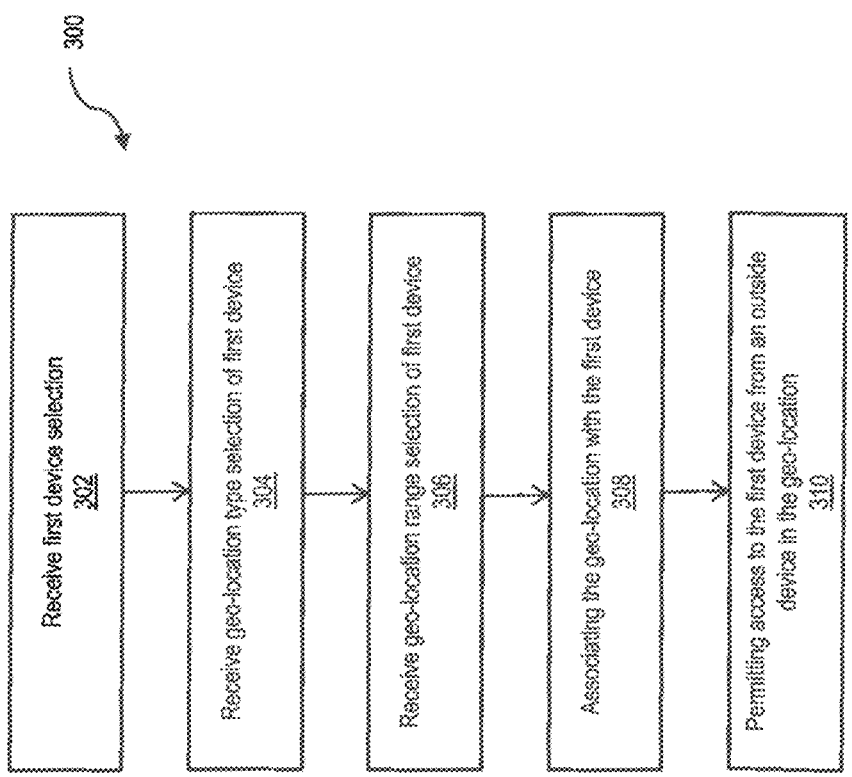
FIG. 3 illustrates a flow chart showing steps for a method for implementing a geo-location based community of interest, according to an exemplary embodiment.

FIG. 3 illustrates a flow chart 300 showing steps for a method of implementing a geo-location based community of interest, according to an exemplary embodiment. In some embodiments, the method for implementing a geo-location based community of interest, may be accomplished with one or more additional steps not described, and/or without one or more of the steps discussed. Additionally, the order in that the steps of the method for implementing a geo-location based community of interest, are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the steps of method 300 in response to instructions stored electronically on an electronic storage medium. The one or more processing devices may include one or more devices configured through hardware, firmware, and/or software to be specifically designed for execution of one or more of the steps of method 300.

At step 302, selection of a first device, second device, and/or a plurality of devices may be received. The user interface on the user computing platform 132 that is connected to a router may receive selection of a first device that contains a unique IP address. The user interface may receive selection of a first device, second device, and/or a plurality of devices. Step 302 may be performed by a geo-location module the same as or similar to geo-location module 106 (shown in FIG. 1 and described above).

At step 304, the geo-location type selection of the first device, second device, and/or a plurality of devices may be received. The user interface on the user computing platform 132 that is connected to a router may receive selection of a type of first geo-location associated with the first device, a type of second geo-location associated with a second device and/or a particular geo-location associated with a plurality of devices.

The geo-location type may be a boundary within a city limit. The geo-location type may be a radius surrounding the first device IP address. The first device may be a plurality of devices associated with the IP address. In yet other implementations, the geo-location type is a boundary within a zip code.

The first device may comprise at least one of a computer, a smartphone, a tablet, a web-cam, a printer, a home appliance, a television, and/or a thermostat. In other implementations, the second device may comprise at least one of a computer, a smartphone, tablet, a web-cam, a printer, a home appliance, a television, and a thermostat. Step 304 may be performed by a geo-location module the same as or similar to geo-location module 106 (shown in FIG. 1 and described above).

At step 306, the geo-location range selection of the first device, second device, and/or a plurality of devices may be received. The user interface on the user computing platform 132 that is connected to a router may receive selection of the range of the geo-location associated with the first device, second device, and/or a plurality of devices. Step 306 may be performed by a geo-location module the same as or similar to geo-location module 106 (shown in FIG. 1 and described above).

At step 308, the geo-location may be associated with the first device, second device, and/or a plurality of devices. The router may associate the first device, second device, and/or a plurality of devices with the geo-location and the range of the geo-location. Step 308 may be performed by a geo-location module the same as or similar to geo-location module 106 (shown in FIG. 1 and described above).

At step 310, the access to the first device, second device, and/or a plurality of devices from an outside device in the geo-location may be permitted. The router may permit access to the first device, second device, and/or a plurality of devices from an outside device within the first, second, and/or pre-defined range of the geo-location. Step 310 may be performed by a decision module the same as or similar to decision module 110 and access module 112 (shown in FIG. 1 and described above).

Figure 4:
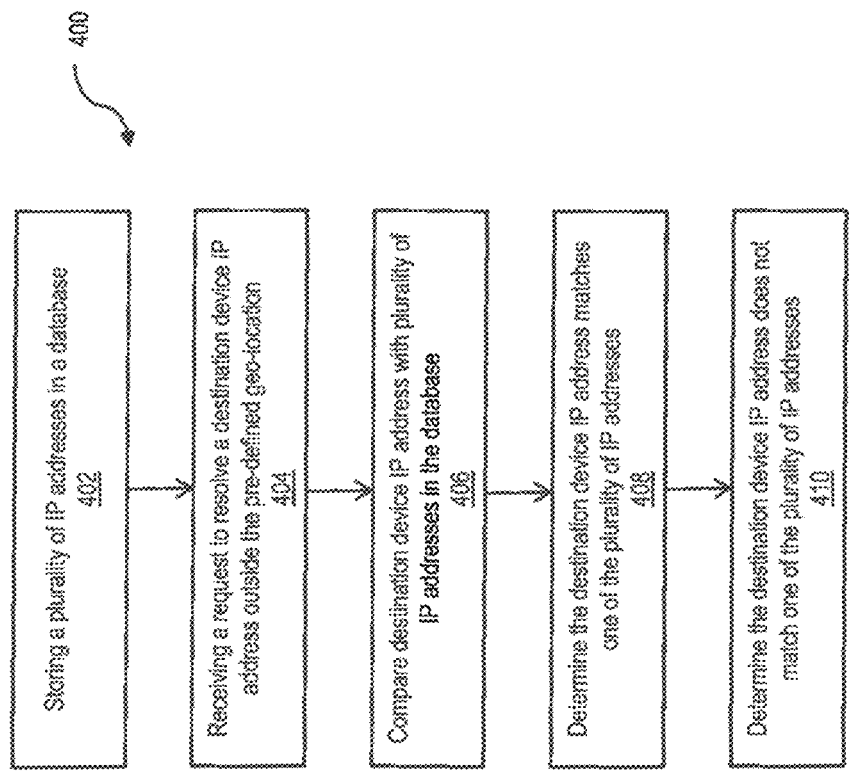
FIG. 4 illustrates a flow chart showing steps for a method for implementing a geo-location based community of interest, according to an exemplary embodiment.

FIG. 4 illustrates a flow chart 400 showing steps for a method of implementing a geo-location based community of interest, according to an exemplary embodiment. In some embodiments, the method for implementing a geo-location based community of interest, may be accomplished with one or more additional steps not described, and/or without one or more of the steps discussed. Additionally, the order in the steps of the method for implementing a geo-location based community of interest are illustrated in FIG. 4 and described below is not intended to be limiting.

Method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the steps of method in response to instructions stored electronically on an electronic storage medium. The one or more processing devices may include one or more devices configured through hardware, firmware, and/or software to be specifically designed for execution of one or more of the steps of method 400.

At step 402, a plurality of IP addresses in a database may be stored. The host server may store a plurality of IP addresses in a host database. The plurality of IP addresses in the host database may be stored by user input and/or are automatically stored electronically. In some implementations, the host database may be stored in electronic storage 118 and/or any other storage. Step 402 may be performed by a geo-location module the same as or similar to geo-location module 106 (shown in FIG. 1 and described above).

At step 404, a request to resolve a destination IP address outside the pre-defined geo-location may be received. The host server may receive a request to resolve a destination device IP address outside a geo-location surrounding a source device IP address. The geo-location may be a boundary within a city limit. In other implementations, the geo-location is a radius surrounding the source device IP address. The source device may be a plurality of devices comprising a first device and a second device, the first device and the second device being different device types. The device types may comprise at least one of a computer, a smartphone, a tablet, a web-cam, a printer, a home appliance, a television, and/or a thermostat. In yet other implementations, the geo-location is a boundary within a zip code. Step 404 may be performed by a request module the same as or similar to request module 124 (shown in FIG. 1 and described above).

At step 406, the destination device IP address may be compared with the plurality of IP addresses in the database. The host server may compare the destination device IP with the plurality of IP addresses. Step 406 may be performed by an analytics module the same as or similar to analytics module 108 (shown in FIG. 1 and described above).

At step 408, a determination that the destination device IP addresses matches one of the plurality of IP addresses may be made. The host server may send the destination device IP address to the router to permit the router to send the destination device IP address packets of information when the destination device IP address matches one of the plurality of IP addresses stored in the host database. Step 408 may be performed by an access module the same or similar to access module 112 and decision module 110 (shown in FIG. 1 and described above).

At step 410, a determination that the destination device IP address does not match one of the plurality of IP addresses may be made. The host server may block the destination device IP address from the router when the destination device IP address does not match one of the plurality of IP addresses stored in the host database. Blocking may not permit the router to send the destination device IP address packets of information to the source device. Step 410 may be performed by a deny module the same or similar to deny module 114 and decision module 110 (shown in FIG. 1 and described above).

Figure 5:
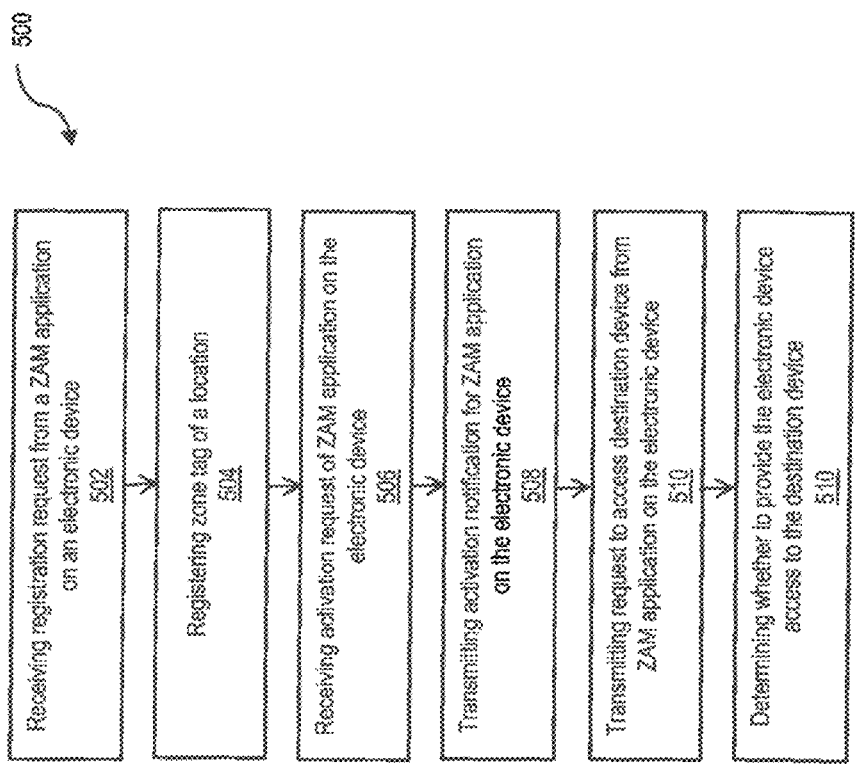
FIG. 5 illustrates a flow chart showing steps for a method for implementing a geo-location based community of interest, according to an exemplary embodiment.

FIG. 5 illustrates a flow chart 500 showing steps for a method of implementing a geo-location based community of interest, according to an exemplary embodiment. In some embodiments, the method for implementing a geo-location based community of interest, may be accomplished with one or more additional steps not described, and/or without one or more of the steps discussed. Additionally, the order in the steps of the method for implementing a geo-location based community of interest are illustrated in FIG. 5 and described below is not intended to be limiting.

Method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the steps of method in response to instructions stored electronically on an electronic storage medium. The one or more processing devices may include one or more devices configured through hardware, firmware, and/or software to be specifically designed for execution of one or more of the steps of method 500.

At step 502, a registration request from a zone-based authentication mechanism (ZAM) application on a user computing platform 132 may be received by a zone tag device. In some implementations, the ZAM application may receive an authentication request from a zone tag device once the zone tag device detects the ZAM application within its vicinity. In other implementations, the ZAM application may transmit an authentication request to the zone tag device once it detects the presence of the zone tag device. Once the authentication process between the ZAM application and the zone tag device has been finalized, the ZAM application may receive and transmit commands between the user computing platform 132 and the IoT devices through the host server 116.

The ZAM application may run on a user computing platform 132 (e.g., a smart device like a cell phone, robot, etc.). The ZAM application may activate and/or deactivate the user computing platform 132 when it is within an IoT device zone as the user computing platform 132 enters and/or leaves a zone. IoT devices can be limited within a zone of interest (or geo-location based community of interest (COI). The ZAM application may also implement a tag RFID, QR, NFC) reader to communicate with the user computing platform 132. The ZAM application may eliminate the need to receive a username and/or password input from the user computing platform 132 for authentication when the user computing platform 132 is inside the zone surrounding the IoT device. The ZAM application may establish communication between the user computing platform 132 and the IoT devices through the zone tag device and the host server 116.

The ZAM application may provide the communication path between its service user (i.e., the user computing platform 132) and the local router utilizing a RISM that monitors activities to its IoT devices. The RISM may run within the router and may be managed and configured by an administrator. The administrator may be a person that provides privileges to a user computing platform 132 in order to access an IoT device. The administrator may also set up the device zone.

The RISM may validate requests to an IoT device based on the geo-location of the user computing platform 132 executing the ZAM application and the IoT device zone. The IoT device zone may be a geographical area around the IoT device. The radius of the zone may be specified by the administrator. Any IP address of a user computing platform 132 that initiates connection to the IoT device may require authentication. Step 502 may be performed by a ZAM module the same as or similar to ZAM module 138 (shown in FIG. 1 and described above).

At step 504, a zone tag device of a location may be used to register the user computing platform 132. Registration may occur when the user computing platform 132 communicates with the zone tag. The zone tag device may use different communication protocols (e.g., RFID, QR, NFC) to register a user computing platform 132 running a ZAM application inside a zone. For instance, a zone tag device may be placed at each entrance of the building defining the area inside a building to create a zone. Another example may be for cases where a zone is the radius around a moving user computing platform 132 and a signal emitted by the user computing platform 132 is detected. When a second user computing platform 132 with the ZAM application can receive the signal from the user computing platform 132, the user computing platform 132 is assumed to be inside the device-zone. Step 504 may be performed by a ZAM module the same as or similar to ZAM module 138 (shown in FIG. 1 and described above).

At step 506, an activation request of the ZAM application on the user computing platform 132 may be received. A privileged IP address may be an IP address with an ability to access an IoT device. The privilege may be validated whenever a connection to the IoT device is requested. An access privilege may be obtained via a username and/or password received from the user computing platform 132 and/or when the ZAM application is executed on the user computing platform 132. Step 506 may be performed by a ZAM module the same as or similar to ZAM module 138 (shown in FIG. 1 and described above).

At step 508, an activation notification for the ZAM application on the user computing platform 132 may be transmitted. Step 508 may be performed by a ZAM module the same as or similar to ZAM module 138 (shown in FIG. 1 and described above).

At step 510, a request to access the destination and/or IoT device from the ZAM application on the user computing platform 132 may be transmitted. In some implementations the user computing platform 132 sends out a packet with the target destination IP address (e.g., IoT device). The RISM may intercept the packet and check the user computing platform 132 IP address against its list if the user computing platform 132 IP address is authenticated, the RISM allows the packet to go through. Otherwise, the RISM may send a request to the IoT device IP address requesting zone activation info. The geo-location of the IoT device IP address may be located. If the zone is activated and the geo-location of the user computing platform 132 is inside the zone of the IoT device, then the IP address of the user computing platform 132 may be added to the list and the original packet may be allowed to proceed. Otherwise, the IP address of the user computing platform 132 may need to be authenticated. Step 510 may be performed by a ZAM module the same as or similar to ZAM module 138 (shown in FIG. 1 and described above).

At step 512, a determination of whether to provide the electronic device access to the destination device may be made. Step 512 may be performed by a ZAM module the same as or similar to ZAM module 138 (shown in FIG. 1 and described above).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Figure 6:
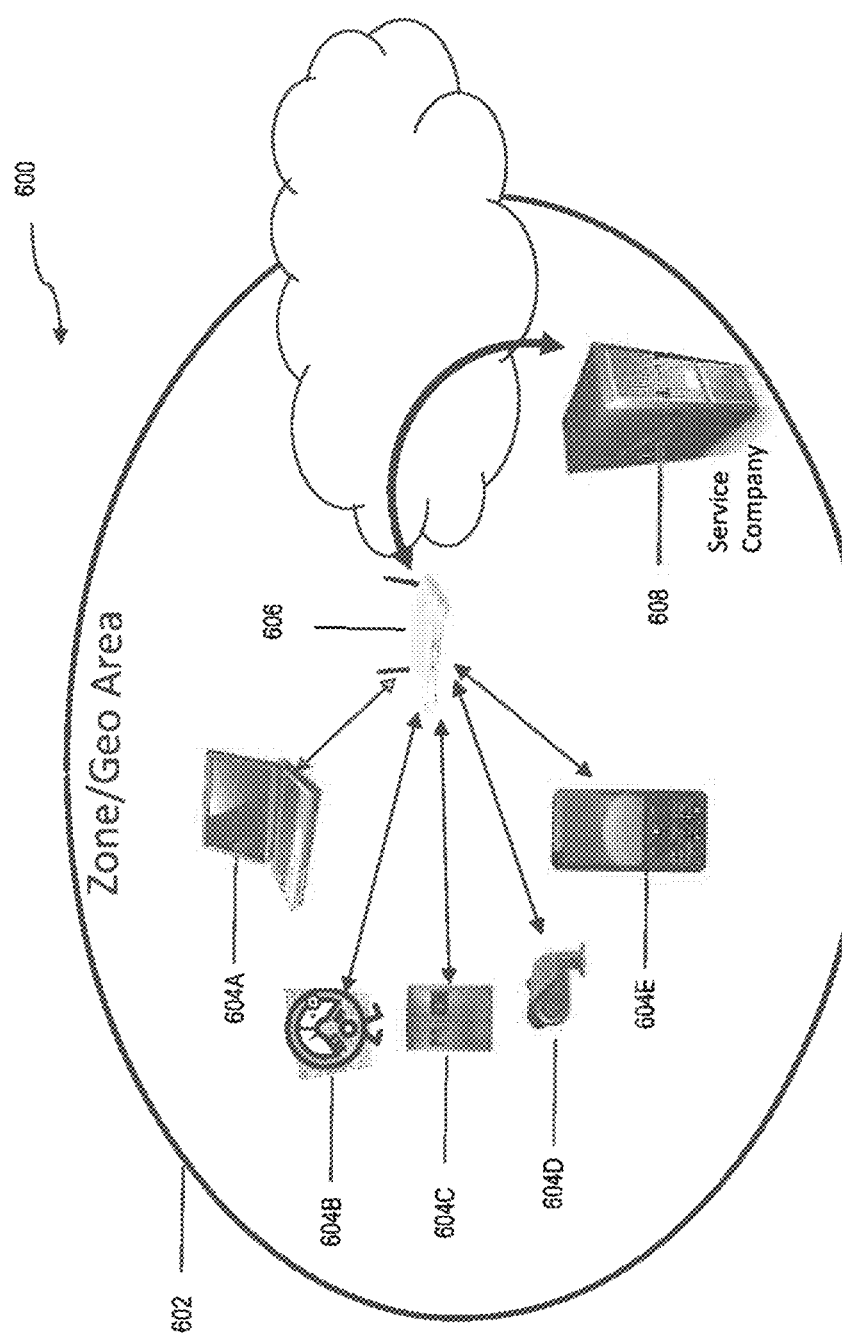
FIG. 6 illustrates a diagram of a system architecture for implementing a geo-location based community of interest, according to an exemplary embodiment.

FIG. 6 illustrates a diagram of a system architecture 600 for implementing a geo-location based community of interest, according to an exemplary embodiment. In some embodiments, the method and/or system for implementing a geo-location based community of interest, may be accomplished with one or more additional steps not described, and/or without one or more of the steps discussed. Additionally, the order in the system elements for implementing a geo-location based community of interest as illustrated in FIG. 6 and described below is not intended to be limiting.

In most cases, the information (e.g., data packets) sourced from devices 604A, 604B, 604C, 604D, 604E are consumed within a local proximity area 602. These zones could potentially be for example inside a building, a campus or a geographical area. Thus, information provided by IoT devices can be limited within a zone of interest (or geo-location based community of interest (COI)).

The system provides an opportunity to contain and limit the access to the data provided by these devices. The system may provide an end-to-end solution. For example, the system may contain a software component that resides in home routers. The system may host a backend that acts as a DNS to routers and IoT devices.

The system may provide the capability to configure network connect devices (NCD) 606 (e.g., routers, network hubs, or smart devices acting as a network) to identify the location of the source and destination IP addresses. The system would then drop any packets that are destined to an IP address outside of its predefined radius. The consumer of this product would select the local IPs of the devices 604A, 604B, 604C, 604D, 604E that utilizes the geo-location based COI system.

The system may configure the NCD 606 with the set of IPs that this feature will apply to, and calculate the location of the configured NCD 606. On any sent/received packets, the system may determine the geo-location position of the remote IP-address on the wide-area network (WAN) 608. The system may calculate the distance between two points on the earth given their latitudes and longitudes. If the distance is greater than the predefined range, the system may deny the packet if the distance is within the predefined range, the system may allow the packet to reach its destination.

This may be utilized for example when an appliance (e.g., HVAC system 604B) requires maintenance. The appliance 604B sends maintenance packet to the service company website within the specified zone 608. The local router 606 may determine that this device is within the zone. The router 606 may allow communication to the destination IP.

Figure 7:
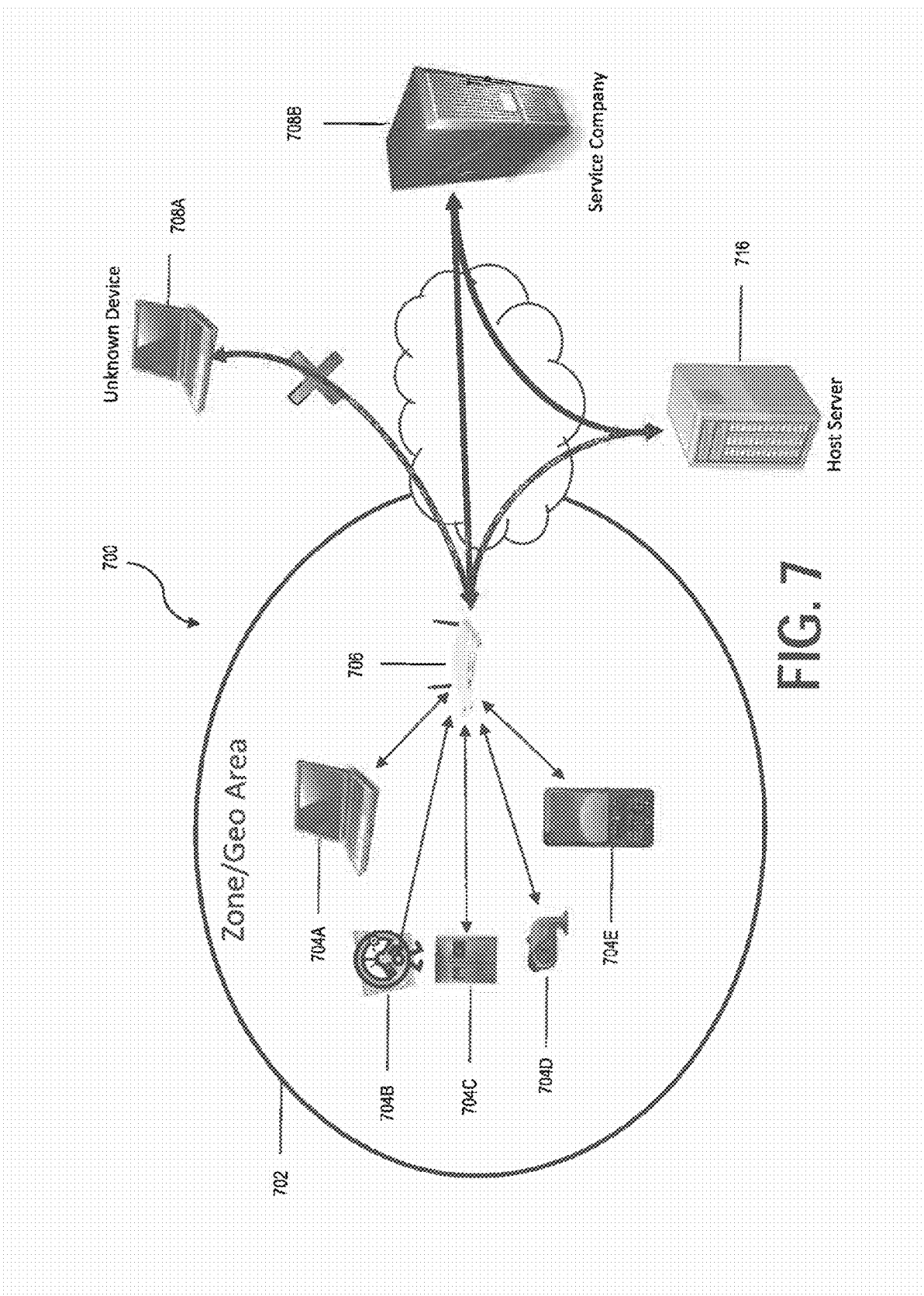
FIG. 7 illustrates a diagram of a system architecture for implementing a geo-location based community of interest, according to an exemplary embodiment.

FIG. 7 illustrates a diagram of a system architecture 700 for implementing a geo-location based community of interest, according to an exemplary embodiment. In some embodiments, the method and/or system for implementing a geo-location based community of interest, may be accomplished with one or more additional steps not described, and/or without one or more of the steps discussed. Additionally, the order in the system elements for implementing a geo-location based community of interest as illustrated in FIG. 7 and described below is not intended to be limiting.

The authentication system may interact as an authentication server to initiate communication between devices 704A, 704B, 704C, 704D, 704E inside a geo-location based. COI 702 and remote device 708A (e.g., personal smart devices) or remote service providers 708B (e.g., HVAC service company).

For example, when an appliance (e.g., refrigerator) 704C requires maintenance, the appliance 704C sends maintenance packet to the service company website. The local router 706 may determine that this device 708B is one of the preselected devices and destination is outside its geographical area. The router 706 communicates to host server 716 to resolve a destination URL. The host server 710 acts as a domain name-server and returns the service company IP. The router 706 may then allow the packets to the destination IP to be delivered for a period of time. The period of time may be pre-determined by the host server, may be selected by the operator, and/or may be set by a user.

Figure 8:
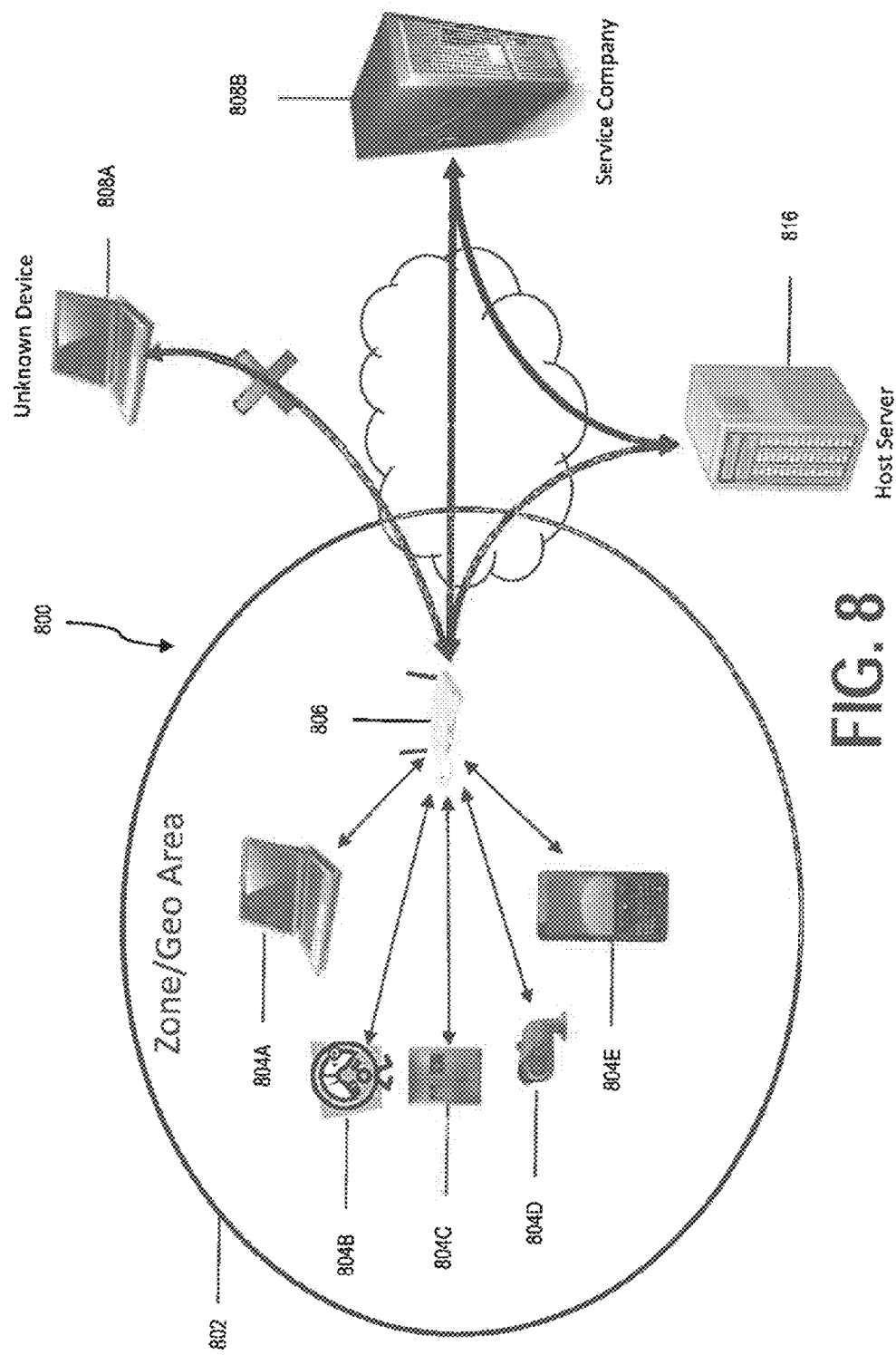
FIG. 8 illustrates a diagram of a system architecture for implementing a geo-location based community of interest, according to an exemplary embodiment.

FIG. 8 illustrates a diagram of a system architecture 800 for implementing a geo-location based community of interest, according to an exemplary embodiment. In some embodiments, the method and/or system for implementing a geo-location based community of interest, may be accomplished with one or more additional steps not described, and/or without one or more of the steps discussed. Additionally, the order in the system elements for implementing a geo-location based community of interest as illustrated in FIG. 8 and described below is not intended to be limiting.

For example, an endpoint 808A wants to access at least one of the protected devices 804A, 804B, 804C, 804D, 804E. The local router 806 may determine that this device 808A is one of the preselected devices and source IP is outside its geographical area 802. The router 806 may communicate to the host server 816 to resolve the destination URL. The host server 816 may act as a domain name-server and send a failed-verification status back to the local router 806. The router 806 may drop packets sourced by the unknown IP address.

Figure 9:
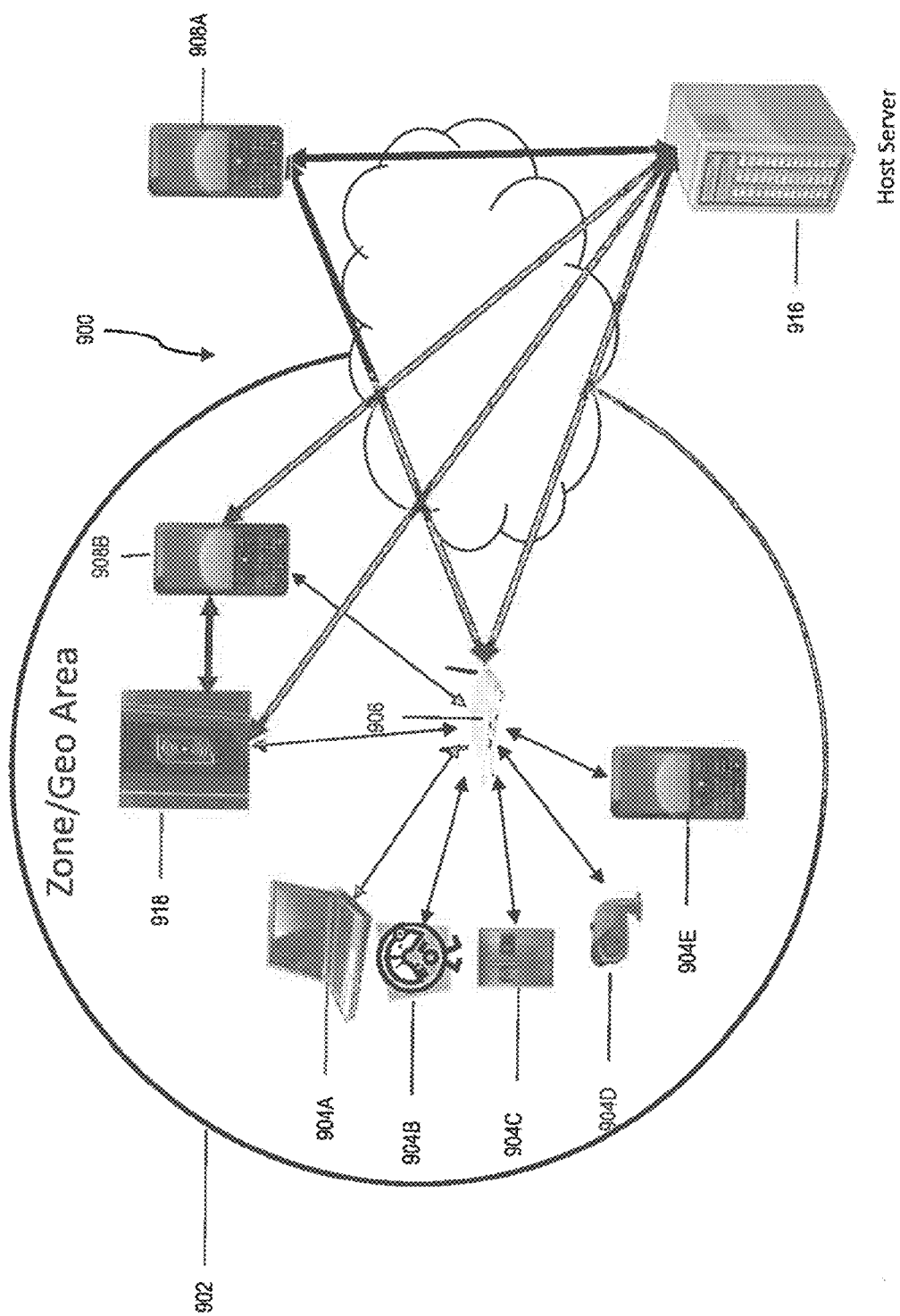
FIG. 9 illustrates a diagram of a system architecture for implementing a geo-location based community of interest, according to an exemplary embodiment.

FIG. 9 illustrates a diagram of a system architecture 900 for implementing a geo-location based community of interest, according to an exemplary embodiment. In some embodiments, the method and/or system for implementing a geo-location based community of interest, may be accomplished with one or more additional steps not described, and/or without one or more of the steps discussed. Additionally, the order in the system elements for implementing a geo-location based community of interest as illustrated in FIG. 9 and described below is not intended to be limiting.

For example, a ZAM application may be a standalone process to authenticate the IP addresses of the user computing platform 132 attempting to access an IoT device. The ZAM application may limit the access to the IoT device to only authorized IP addresses of user computing platform(s) 132. The ZAM application may also automate the authentication process, which can be deployed by itself or augment the geo-location based COI process.

A ZAM application may need to be authenticated and/or registered by the administrator for each user computing platform 132. The authentication process may comprise several steps. For example, the ZAM application on the user computing platform(s) 132 may need to be registered during its initial use. In some implementations, for additional security, registering per IoT device may be added. The administrator may need to register each zone tag device 918 that is used by the ZAM application running on user computing platform(s) 908A, 908B. A tag 918 may be used for only one zone 902. Multiple IoT devices 904A, 904B, 904C, 904D, 904E can share the same tag if they have a similar zone. The administrator may set the zone of each device. A zone may be associated with more than one zone tag device.

The user computing platform(s) 908A, 908B may be scanned by a zone tag device 918 that may activate and/or deactivate the ZAM application on the user computing platform(s) 908A, 908B that have the same zone as the zone tag device 918.

The user computing platform(s) 908A, 908B may access at least one of the protected devices 904A, 904B, 904C, 904D, 904E. The RISM running on the local router 906 may determine that the user computing platform(s) 908A, 908B is one of the preselected devices and source IP is outside its geographical area 902. The RISM and ZAM application perform the following sequences for every access request by user computing platform(s) 908A, 908B to IoT devices 904A, 904B, 904C, 904D, 904E.

A registered ZAM application on user computing platform(s) 908A, 908B may send a notification to RISM running on the local router 906 whenever the ZAM application becomes activated and/or deactivated for a zone 902.

The ZAM application on user computing platform(s) 908A, 908B may send a request to RISM running on the local router 906 to access at least one of the protected IoT devices 904A, 904B, 904C, 904D, 904E.

The RISM running on the local router 906 may obtain the geo-location of the IP address of the user computing platform(s) 908A, 908B running the ZAM application.

The RISM may obtain the zone of the target IoT device 904A, 904B, 904C, 904D, 904E from its device list. The RISM may then determine the following scenario that applies and provide an action based on the scenario.

In scenario A, a ZAM application has not been activated for an IoT device's zone 902 and the IP address of the user computing platform 908A running the ZAM application is outside of the zone 902. If scenario A applies, the RISM may request a username and/or password authentication by the ZAM application running on the user computing platform 908A.

In scenario B, a ZAM application has been activated for an IoT device's zone 902 and the IP address of the user computing platform 908A running the ZAM application is outside of the zone 902. If scenario B applies, the RISM may request a username and/or password authentication by the ZAM application running on the user computing platform 908A.

In scenario C, a ZAM application has not been activated for an IoT device's zone 902 and IP address of the user computing platform 908B running the ZAM application is inside the zone 902. If scenario C applies, the RISM may request a username and/or password authentication by the ZAM application running on the user computing platform 908B.

In scenario D, a ZAM application has been activated for an IoT device's zone and the IP address of the user computing platform 908B running the ZAM application is inside the zone 902. If scenario D applies, the RISM may send an acknowledgment command back to ZAM application running on the user computing platform 908B to allow the user computing platform 908B to communicate with the IoT device (e.g., 904A). Additionally, in scenario D, the RISM could save the IP address of the user computing platform 908B running the ZAM application to avoid a need to validate the user computing platform 908B for each request to communicate with an IoT device in the zone 902.

Figure 10:
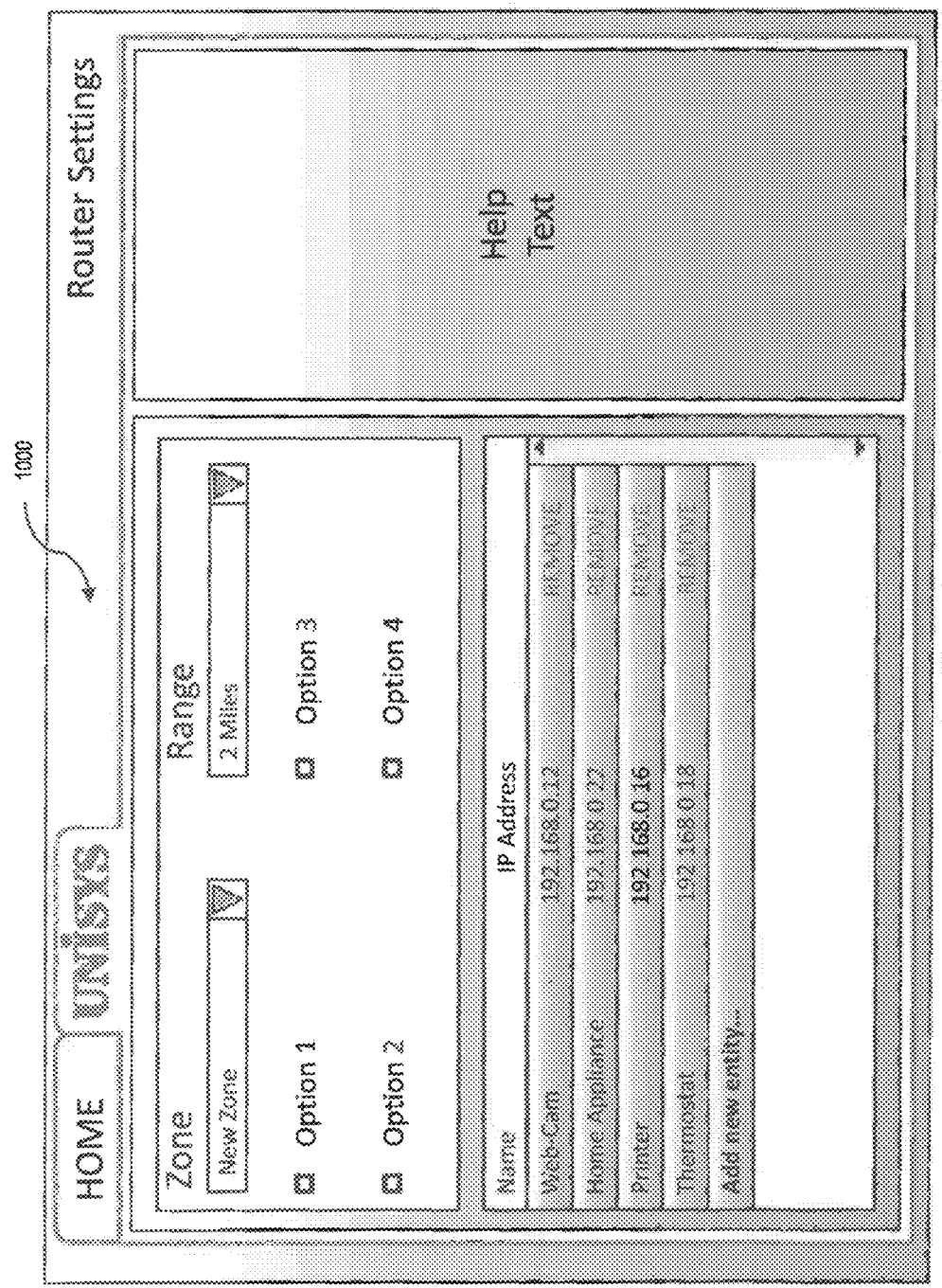
FIG. 10 illustrates a user interface for implementing a geo-location based community of interest, according to an exemplary embodiment.

FIG. 10 illustrates a user interface 1000 for implementing a geo-location based community of interest, according to an exemplary embodiment. In some embodiments, the method and/or system for implementing a geo-location based COI, may be accomplished with one or more additional steps not described, and/or without one or more of the steps discussed. Additionally, the order in the system elements for implementing a geo-location based community of interest as illustrated in FIG. 10 and described below is not intended to be limiting.

User interface 1000 is an example of graphical user interface (GUI) of the software provided on the user computing platform 132. The user may select an item (e.g., home appliance such as the refrigerator) and set up a geo-location radius for the router. The GUI may provide the user with the option to allow only incoming traffic and/or outgoing traffic (e.g., allow the service company to send information to the refrigerator and/or allow the service company to receive information from the refrigerator). The GUI may allow the user to add devices to zones and/or limit them to options based on the radius.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Although certain illustrative, non-limiting exemplary embodiments have been presented, various changes, substitutions, permutations, and alterations can be made without departing from the scope of the appended claims. Further, the steps of the methods described herein may be carried out in any suitable order, or simultaneously where appropriate. Thus, the scope of the invention should not necessarily be limited by this description. The scope of the present invention is instead defined by the following claims.

Unless specifically stated otherwise as apparent from the following discussion, it is appreciated that throughout the description, discussions utilizing terms such as "processing," "computing," "transmitting," "receiving," "determining," "displaying," "identifying," "presenting," "establishing," or the like, can refer to the action and processes of a data processing system, or similar electronic device, which manipulates and transforms data represented as physical (electronic) quantities within the system's registers and memories into other data similarly represented as physical quantities within the system's memories or registers or other such information storage, transmission or display devices. The system or portions thereof may be installed on an electronic device.

The exemplary embodiments can relate to an apparatus for performing one or more of the functions described herein. This apparatus may be specially constructed for the required purposes and/or be selectively activated or reconfigured by computer executable instructions stored in non-transitory computer memory medium.

It is to be appreciated that the various components of the technology can be located at distant portions of a distributed network and/or the Internet, or within a dedicated secured, unsecured, addressed/encoded and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element that is capable of supplying and/or communicating data to and from the connected elements. The term "module" as used herein can refer to any known or later developed hardware, software, firmware, or combination thereof that is capable of performing the functions associated with that element.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Presently preferred embodiments of this invention are described herein, including the best mode known to the inventors for carrying out the invention. The inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer implemented method comprising:
   transmitting, by a host server to a router, a request to access a destination device with a pre-determined zone from a zone-based authentication mechanism (ZAM) application for an electronic device;
   transmitting, by the host server to the router, the geo-location of the IP address of the electronic device;
   when the ZAM application for the electronic device has not been activated for the destination device and the geo-location of the IP address of the electronic device is outside the zone of the destination device, receiving, by the host server from the router, an authentication request for the ZAM application of the electronic device;
   when the ZAM application for the electronic device has been activated for the destination device and the geo-location of the IP address of the electronic device is outside the zone of the destination device, receiving, by the host server from the router, an authentication request for the ZAM application of the electronic device;
   when the ZAM application for the electronic device has not been activated for the destination device and the geo-location of the IP address of the electronic device is within the zone of the destination device, receiving, by the host server from the router, an authentication request for the ZAM application of the electronic device; and
   when the ZAM application for the electronic device has been activated for the destination device and the geo-location of the IP address of the electronic device is within the zone of the destination device, receiving, by the host server from the router, an acknowledgement command for the ZAM application of the electronic device to allow the destination device to communicate with the ZAM application of the electronic device.

2. The method of claim 1, further comprising:
   receiving, by the host server from a zone tag device, a request to activate a ZAM application for an electronic device;
   transmitting, by the host server, an activation for the ZAM application for the electronic device;
   transmitting, by the host server to the router, a notification the ZAM application for the electronic device is activated.

3. The method of claim 1, wherein the request to activate the ZAM application for the electronic device is initiated by the electronic device.

4. The method of claim 1, wherein the request to activate the ZAM application for the electronic device is initiated by the zone tag device.

5. The method of claim 1, wherein the activation is transmitted from the zone tag device to the electronic device.

6. The method of claim 1, wherein the activation is transmitted to the electronic device.

7. The method of claim 2, wherein the request to activate the ZAM application for the electronic device occurs when the electronic device is within a pre-determined radius of the zone tag device.

8. The method of claim 1, wherein the pre-determined zone of the destination device is a radius around the destination device.

9. The method of claim 1, wherein the geo-location is a radius surrounding the location of the electronic device IP address.

10. The method of claim 1, wherein the geo-location is a boundary within a zip code.

* * * * *